(12) United States Patent
Kho

(10) Patent No.: US 6,590,725 B2
(45) Date of Patent: Jul. 8, 2003

(54) SIDEVIEW MIRROR FOR VEHICLES AND ANGLE ADJUSTING DEVICE THEREOF

(76) Inventor: Myung Duk Kho, 18-40 Kangnam Apt., 1648 Sinlim 8-Dong, Kwanak-Ku, Seoul 151-018 (KR)

( * ) Notice: Subject to any disclaimer, the term of this patent is extended or adjusted under 35 U.S.C. 154(b) by 0 days.

(21) Appl. No.: 09/988,890

(22) Filed: Nov. 19, 2001

(65) Prior Publication Data

US 2002/0063976 A1 May 30, 2002

Related U.S. Application Data

(63) Continuation of application No. PCT/KR00/00179, filed on Mar. 7, 2000.

(30) Foreign Application Priority Data

| | | | |
|---|---|---|---|
| May 19, 1999 | (KR) | | 1999-18029 |
| Sep. 18, 1999 | (KR) | | 1999-40282 |
| Feb. 17, 2000 | (KR) | | 2000-7610 |

(51) Int. Cl.[7] .................... G02B 5/04; G02B 7/182
(52) U.S. Cl. ........................ 359/834; 359/872
(58) Field of Search ............... 359/831, 833, 359/834, 836, 838, 871, 872; 248/479, 481

(56) References Cited

U.S. PATENT DOCUMENTS

| | | | |
|---|---|---|---|
| 4,101,206 A | | 7/1978 | Oskam et al. |
| 4,514,060 A | * | 4/1985 | Mittelhauser ............... 248/476 |
| 4,968,124 A | * | 11/1990 | Deckert et al. ............. 359/435 |
| 5,264,962 A | * | 11/1993 | Kho ......................... 15/250.05 |
| 5,550,673 A | * | 8/1996 | Goldstein .................... 359/367 |
| 5,721,639 A | * | 2/1998 | Aoshima et al. ............ 359/507 |
| 6,362,918 B1 | * | 3/2002 | Netzer ........................ 359/399 |

FOREIGN PATENT DOCUMENTS

| | | |
|---|---|---|
| JP | 61-146447 U | 9/1986 |
| JP | 1-102036 U | 7/1989 |
| JP | 7-61288 A | 3/1995 |

* cited by examiner

*Primary Examiner*—Euncha Cherry
(74) *Attorney, Agent, or Firm*—Akin, Gump, Strauss, Hauer & Feld, L.L.P.

(57) ABSTRACT

The present invention relates to a sideview mirror for vehicles and an angle adjusting device thereof which includes a housing pivotable on the inner and outer guide lines of the vehicle; an Amici type prism installed within the focal length of an object lens so as to reflect the ray passing through the object lens for refracting the ray passing through an outer rearward portion of the vehicle to be converged; a reflector installed beyond the focal length of the object lens and adapted to reflect the ray reflected by the prism to an inner aperture portion of the housing; and an eye lens system magnifying and refracting the ray reflected by the reflector so as to form an image having unit magnification for thereby forming an afocal system. In addition, an angle adjusting device for automatically or manually adjusting the angle of the sideview mirror for vehicles is provided to make the driver see the view at the rear of the vehicle with respect to the movement direction of the vehicle accurately and easily and at the same time automatically or manually adjust the angle of the sideview mirror according to the physical conditions of the driver.

24 Claims, 10 Drawing Sheets

SIDEVIEW MIRROR FOR VEHICLES AND ANGLE ADJUSTING DEVICE THEREOF

CROSS-REFERENCE TO RELATED APPLICATIONS

This application is a continuation of International Application No. PCT/KR00/00179, filed Mar. 7, 2000, which was published in the English language on Nov. 23, 2000 under International Publication No. WO 00/69682 and the disclosure of which is incorporated herein by reference.

BACKGROUND OF THE INVENTION

The present invention relates to a sideview mirror for vehicles and an angle adjusting device thereof, and more particularly, a sideview mirror for vehicles and an angle adjusting device thereof by which a driver can accurately and easily see the view at the rear of a vehicle at unit magnification with respect to the movement direction of the vehicle, and the angle of the sideview mirror can be automatically or manually adjusted according to the physical conditions of the driver.

Generally, a vehicle has a pair of sideview mirrors externally protruded at the driver's side and passenger's side of each front side window frame of the vehicle, so that a driver can view the rear of the left and right side roads against the movement direction of the vehicle.

A conventional sideview mirror for vehicles of the planar reflector type having an almost plane reflecting surface is protruded beyond the front body of the vehicle horizontally with respect to a forward-backward axis of the vehicle body, which causes an air resistance.

Such an air resistance increases fuel consumption of the vehicle, and resultantly causes air pollution.

In addition, this planar reflector type sideview mirror has a relatively small rear viewing angle, for example, less than 20 degree., and it may be exposed to water drops, moisture and frost in bad weather such as rainy or snowy weather, thereby making it difficult for the driver to view the rear. As a result, there is a danger of an accident.

Furthermore, while driving at night, the ray emitted from the headlights of the following vehicle is directly reflected at the sideview mirror (at the reflection factor of 50%), making the driver's view unclear. As a result, there is a problem that the conventional type sideview mirror is lacking in safety.

Considering these problems, a sideview mirror capable of reducing the length thereof protruded beyond the body of the vehicle and increasing the rear view angle using an optical element is disclosed in PCT Application No. WO96/31365 and U.S. Pat. No. 5,559,640, respectively.

Firstly, in the aforesaid PCT Application WO96/31365, as disclosed in the specification and drawings thereof, the driver can see the view at the rear of the vehicle through a sideview mirror constructing of two reflectors and four lenses.

However, in the PCT Application WO096/31365, since the four lenses are arranged upwardly and downwardly, and the two reflectors are arranged between the lenses, it is difficult to adjust an optical axis passed and reflected through each of the lenses and reflectors due to vibration of the vehicle. In addition, an eye lens (screen lens) through which the driver finally view the rear of the vehicle is installed at a lower portion of a so-called "A pillar". As a result, there is a problem that the construction and installation of the sideview mirror is complicated.

In addition, in the construction according to the above PCT application, it is difficult to focus on an object at a long distance and at a short distance at the same time, and moreover the sideview mirror is difficult to be designed to see the rear view at the unit magnification. Thus, the sideview mirror of the PCT application has almost not been put into practical use yet.

Meanwhile, in the sideview mirror according to the U.S. Pat. No. 5,559,640, as disclosed in the specification and drawings thereof, a relatively small convex mirror is arranged outside the vehicle, and a reflector by which an image reflected from the convex mirror is magnified to be reflected on the convex lens is arranged between the convex mirror and the convex lens which the driver look at, thereby making it possible for the driver to view the rear of the vehicle.

In the sideview mirror for vehicles according to the above U.S. Patent Application, however, the image of a magnifier directed toward the driver's eye is greatly distorted in a vertical direction and in a horizontal direction. As a result, there is a problem that the function as a sideview mirror for vehicles cannot be substantially implemented.

Accordingly, a "sideview mirror for vehicles" directed to solve these conventional problems is disclosed in Korean Utility Model Publication No. 76588 and U.S. Pat. No. 5,264,962 by the applicant of the present invention.

Since the aforesaid sideview mirror for vehicles proposed by the applicant includes two lens groups, that is, an object lens system and an eye lens system, and a planar reflector inserted between these systems, it provides a relatively wide field of view toward the rear of the vehicle and a relatively short optical axis for thereby making it easy for the driver to view the rear of the vehicle.

However, in this sideview mirror for vehicles proposed by the applicant, it is not easy for the image incident upon the object lens system to be passed through the eye lens system to have an unit magnification. In particular, there is a problem that the driver's eye is not easily made consistent with the axis of the eye lens system in the housing installed adjacent to the driver's side.

BRIEF SUMMARY OF THE INVENTION

Therefore, it is an object of the present invention to provide a sideview mirror for vehicles and an angle adjusting device thereof, and more particularly, to a sideview mirror for vehicles and an angle adjusting device thereof by which a driver can accurately and easily see the view at the rear of a vehicle at unit magnification with respect to the movement direction of the vehicle, and the angle of the sideview mirror can be automatically or manually adjusted according to the physical conditions of the driver.

To achieve the above object of the invention, there is provided a sideview mirror for vehicles which includes: a housing connected to a forward portion of the driver's seat of the vehicle so that an aperture formed at one side is directed to an outer rearward portion of the vehicle and an aperture at the other side is arranged inside the vehicle; an object lens system having at least one object lens for refracting a ray from the outer rearward portion of the vehicle to be converged, an upper reflecting unit arranged in the housing at a predetermined angle within the focal length of the object lens so as to reflect the ray passing through the object lens to the interior of the vehicle and adapted to reflect the ray passing through an upper side of the horizontal center line of the object lens, and a lower reflecting unit arranged in a lower portion the upper reflecting unit so that the upper reflecting unit is at a right angle with a reciprocal internal angle and a reciprocal contact line corresponds to the horizontal center line of the object lens and adapted to reflect a ray passing through a lower side of the horizontal center line of the object lens; and an eye lens system having a third reflecting unit arranged beyond the focal length of the object lens and adapted to reflect the ray reflected by the upper reflecting unit and lower reflecting unit to an inner aperture portion of the housing and at least one eye lens connected to the inner aperture portion of the housing and adapted to magnify and refract the ray reflected by the third reflecting unit to form an image having either an unit magnification or a predetermined magnification for thereby forming an afocal system.

The object lens, upper reflecting unit, and lower reflecting unit are Amici type prisms integral with one another.

The third reflecting unit is a planar reflector.

The third reflecting unit and the eye lens are integral with each other.

The third reflecting unit is a prism.

The eye lens includes a plano-convex lens arranged in an inner aperture portion of the housing and a concave-convex lens arranged between the plano-convex lens and the third reflecting unit.

The housing includes an outer tubular unit having a spherical unit at one end exposed to the interior of the vehicle to be connected thereto and an inner tubular unit pivotably connected to the spherical unit.

At the circumference of the outer tubular unit, the sideview mirror for vehicles further includes an outer duct connected to the circumference of the outer tubular unit to surround the same and having an air inlet formed at one end and a first branching pipe for guiding air introduced through the outer duct to the surface of the object lens.

At the circumference of the inner tubular unit, the sideview mirror for vehicles further includes an inner duct connected to the circumference of the inner tubular unit to surround the same and of which one end is communicated with the outer duct and a second branching pipe for guiding air introduced through the air inlet to the surface of the eye lens arranged in the aperture portion of the housing.

The sideview mirror for vehicles further includes a heating unit arranged in an flow channel of the air introduced through the air inlet and adapted to heat the air.

The sideview mirror for vehicles further includes a blower arranged in the outer tubular duct and adapted to enable air from the outside to be introduced into the outer duct through the air inlet.

To achieve another object of the present invention, there is provided an automatic angle adjusting device of a sideview mirror for vehicles which includes: an auto driving box of which one end portion is rotatably mounted in a door panel of a driver's seat and passenger's seat and adapted to interlock an inner tubular unit of a sideview mirror housing; a driving source mounted within the auto driving box and adapted to be driven in order to transmit power during automatic adjusting of the horizontal/vertical angle of the inner tubular unit of the housing; a horizontal driving unit driven by the driving power of the driving source during horizontal adjusting of the angle of the inner tubular unit of the housing; a vertical driving unit driven by the driving power of the driving source during vertical adjusting of the angle of the inner tubular unit of the housing; and a clutch unit having one or more relay gears for selectively interrupting the power transmitted between the horizontal and vertical driving units.

The horizontal driving unit includes: a driving gear installed at the end of the axis of a motor that is a driving source and adapted to be rotated by the rotating power of the motor axis; a horizontal power transmission gear rotated by the rotating power transmitted from the driving gear, a plurality of reduction gears, and the clutch unit in order to adjust the horizontal angle of the inner tubular unit of the housing; and a horizontal adjusting gear installed to be engaged between the horizontal power transmission gear and a horizontal rack gear formed at the door panel and adapted to be rotated by the rotating power from the horizontal power transmission gear in order to adjust the angle of the inner tubular unit of the housing toward a horizontal direction by moving along the horizontal rack gear.

The vertical driving unit includes: a driving gear installed at the end of the axis of a motor that is a driving source and adapted to be rotated by the rotating power of the motor axis; a vertical power transmission gear rotated by the rotating power transmitted from the driving gear, a plurality of reduction gears, and the clutch unit in order to adjust the vertical angle of the inner tubular unit of the housing; a vertical rotating axis installed in the center of the vertical power transmission gear and adapted to be rotated by the rotating power from the vertical power transmission gear; and a vertical adjusting member of which an upper end portion is hingeably connected to the center of a lower end of a connecting member installed in the inner tubular unit of the housing and in which a guide ring penetrated by the vertical rotating axis to be engaged therewith is fixed for thereby raising and lowering the inner tubular unit of the housing by rotation of the vertical rotating axis.

The clutch unit includes: a power conversion link rotatably installed between the horizontal power transmission gear and the vertical power transmission gear; a first relay gear installed at one side of the upper portin of the power conversion link to be engaged with the reduction gears and adapted to rotate the power conversion link by a transmitted rotating power; a second relay gear installed at the other side of the upper portion of the power conversion link to be engaged with the first relay gear and adapted to be selectively engaged with the horizontal power transmission gear and the vertical power transmission gear by rotation of the power conversion link; a guiding member of which one end is connected to a long guiding hole formed at an end portion of the power conversion link and which has an actuating flap formed at the other end thereof for thereby guiding the rotation of the power conversion link; a clutch box facing to the actuating flap and having an electromagnet attached thereto and contacted by the actuating flap as power is applied during adjusting of the vertical angle of the inner tubular unit of the housing; and a spring installed between the actuating flap and the interior of the clutch box and adapted to provide springback force to the actuating flap when the power transmitted to the electromagnet is turned off.

A guide rail is installed in a forward portion of a mounting groove formed inside the door panel, and a roller for guiding the horizontal movement of the auto driving box along the guide rail and supporting the auto driving box at a predetermined height is rotatably installed at a lower portion of the auto driving box facing to the guide rail.

To achieve still another object of the present invention, there is provided a manual angle adjusting device of a sideview mirror for vehicles which includes: a manual adjusting box of which one end portion is rotatably installed in a door panel of a driver's seat and passenger's seat and adapted to interlock an inner tubular unit of a sideview mirror housing; a vertical driving unit driven during adjusting of the vertical angle of the inner tubular unit of the housing; and a horizontal driving unit driven during adjusting of the horizontal angle of the inner tubular unit of the housing.

The vertical driving unit includes: an adjusting axis installed inside the manual adjusting box; a vertical driving gear installed at one end of the adjusting axis and adapted to be rotated by rotating power of the adjusting axis during adjusting of the vertical angle thereof; a vertical adjusting handle formed at the other end of the adjusting axis outside the door panel and adapted to be hold during adjusting of the vertical angle thereof; a vertical power transmission gear installed to vertically cross the vertical driving gear and adapted to be rotated by rotating power by engagement with the vertical driving gear during adjusting of the vertical angle of the inner tubular unit of the housing; a vertical rotating axis installed at the center of the vertical power transmission gear and adapted to be rotated by the rotating power of the vertical power transmission gear; and a vertical adjusting member of which an upper end portion is hingeably connected to the center of a lower end of a connecting member installed in the inner tubular unit of the housing and in which a guide ring penetrated by the vertical rotating axis to be engaged therewith is fixed for thereby raising and lowering the inner tubular unit of the housing by rotation of the vertical rotating axis.

The horizontal driving unit includes: an adjusting axis installed inside the manual adjusting box; a horizontal flow preventing unit of a cone-type installed at the bottom surface of the manual adjusting box for thereby forming a spiral groove on the inner circumferential surface thereof; a spring receiver installed inside the horizontal flow preventing unit; a spring installed between the interior of the horizontal flow preventing unit and the spring receiver; a cone-type friction gear inserted into the horizontal flow preventing unit to be engaged with the spiral groove at the other end portion of the adjusting axis; a horizontal adjusting gear formed at the rear of the friction gear to be engaged with a horizontal rack gear formed in the door panel; and a horizontal adjusting handle formed at the rear of the horizontal adjusting gear and adapted to be hold for thereby rotating the horizontal adjusting gear during adjusting of the horizontal angle of the sideview mirror.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Hereinafter, the sideview mirror for vehicles and angle adjusting device thereof according to the present invention will now be described in detail with reference to the accompanying drawings.

Prior to explanation of the sideview mirror for vehicles and angle adjusting device thereof according to the present invention, an afocal system designed to view at unit magnification by an optical system for viewing rearwardly is adapted to the sideview mirror of the present invention.

The afocal system which is an optical system for viewing the rear of the sideveiw mirror according to the present invention is as follows.

To design an afocal system with two groups of lens, the total power k of the system, which is expressed as function of individual lens power k1, k2 and the distance d between two lens groups as the equation, is set to zero, i.e., $$k = k1 + k2 - K1 - K2d = 0 \tag{1}$$

The Lagrange invariant of the afocal system is expressed as follows;

$$n1h1\beta1 = n2h2\alpha2 \tag{2}$$

And the angular magnification, MA is represented as follows;

$$MA = \beta2/\beta1 = h1/h2 \tag{3}$$

Where, n1 and n2 represent the index of refraction of each lens, β1 and β2 represent field angle, that is, half the angle formed by an object and an eye from the optical axis, and h1 and h2 represent the beam height of paraxial parallel rays before and after the ray passing through the system, respectively.

To make the afocal system an unit magnification system, $$|h1/h2| = 1, \text{ i.e., } |h2| = |h1(1-k1d)| = |h1| \tag{4}$$

The equation (4) says, k1d=0, or d=2/k1. When k1d=0, the system is same as a pair of glass window, and do noting for the optical path of the ray from the object. When d=2/k1, the distance d must be a positive value to have physical meaning and k1>0. And, the distance d is twice the focal length of first lens group. In this case, the equation (1) says k1=k2. In another word, the two lens groups have the same focal length, and the distance between the two groups of lens are sum of each focal length. And, it says the system is kind of Kepler telescope system with unit magnification.

When the aperture of the system is palced at the distance b from the second lens group (eye lens system of the present invention), the diameter ratio between the two lens groups is represented as follows;

$$D2/D1 = |b/b-d|$$

Hence, if b is larger than the focal length of a first lens group, the diameter of the second lens group is larger than that of the first lens group.

As described above, the sideview mirror for the vehicle of the present invention is manufactured with its basic concept of the afocal system having unit magnification. Hereinafter, the sideview mirror for the vehicle according to the present invention will now be described.

Figure 1:
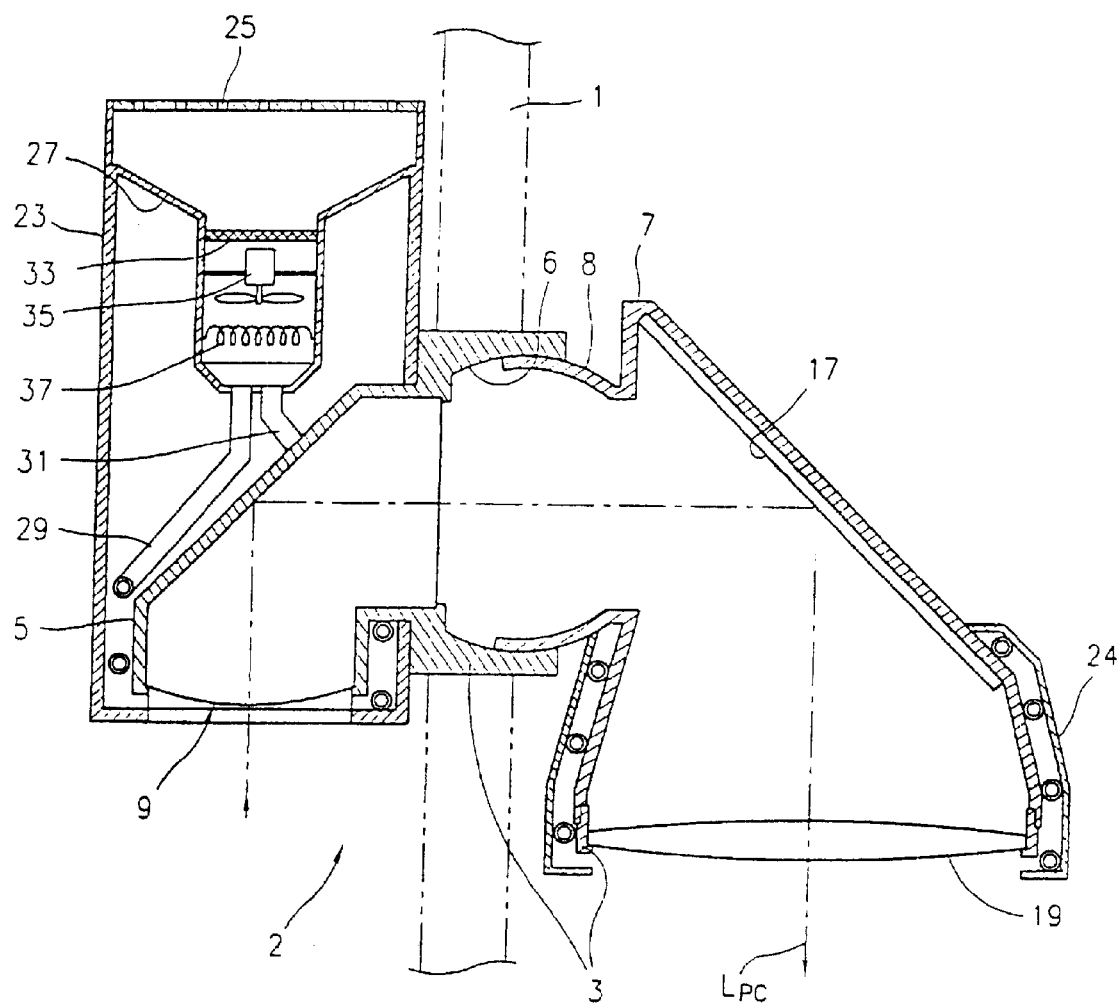
FIG. 1 is a vertical cross-sectional view of a sideview mirror for vehicles according to one embodiment of the present invention.

FIG. 1 is a vertical cross-sectional view of a sideview mirror for vehicles according to one embodiment of the present invention. As illustrated therein, the sideview mirror 2 of the present invention includes: a housing 3 configured as a tubular member connected to a forward portion of a driver's seat and passenger's seat so that an aperture formed at one end is directed toward the rear of the vehicle 1 and at the same time an aperture formed at the other side is directed to the interior of the vehicle 1; an object lens system arranged at an external aperture portion of the housing 3 and adapted to refract a ray from the rearward portion of the vehicle 1 to be converged; an eye lens system arranged in the forward portion of the object lens along the movement direction of an optical axis (Lpc) passing through the object lens system and adapted to form an afocal optical system along with the object lens system by magnifying and refracting the ray passing through the object lens system so that it becomes an image having either unit magnification at which the driver can see as seen with the naked eye or a predetermined magnification; and an air guiding unit installed at the circumferential portion of the housing 3 outside the vehicle 1 and adapted to guide air from the outside to the object lens system and eye lens system.

The housing 3 includes an outer tubular unit 5 connected thereto so that an aperture formed at one side is directed to the rear of the vehicle 1 and the other side thereof is directed to the interior of the vehicle 1 and an inner tubular unit 7 communicating with the outer tubular unit 5 and pivotably connected to the outer tubular unit 5.

A spherical unit 6 is formed inside the other end of the outer tubular unit 5 connected toward the interior of the vehicle 1, and a spherical unit 8 of the inner tubular unit 7 is pivotably connected to the spherical unit 6.

The air guiding unit includes an air inlet 25 extended to face the aperture of the outer tubular unit 5 and adapted to receive air from the outside, an outer duct 23 connected to the outer tubular unit 5 to surround the same at a distance for guiding air therebetween, and an inner duct 24 connected to the inner tubular unit 7 to surround the end portion of the inner tubular unit 7 at a distance for guiding air therebetween.

Inside the outer duct 23, an opening and closing device (not shown) for opening and closing the air inlet 25 is prepared, and an air guiding tube 27 forming an air flow channel is connected.

At the terminal of the air guiding tube 27, a first branching pipe 29 and second branching pipe 31 are connected to guide the air received from the air inlet 25 to the object lens system and eye lens system.

The first branching pipe 29 is arranged in a coil shape at the circumferential portion of the outer tubular unit 5, of which the end portion is fixed on the surface of the object lens 11 arranged at the outermost portion of the outer tubular unit 5 to inject air.

The second branching pipe 31 is arranged in a coil shape at the circumferential portion of the inner tubular unit 7, of which the end portion is fixed on the surface of the eye lens 19 arranged at the outermost portion of the inner tubular unit 7 to inject air.

Meanwhile, a filtering member 33 arranged laterally with respect to the air flow channel and adapted to remove dust from the air received from the outside is connected within the air guiding tube 27, and a blowing device 35 adapted to guide air toward the eye lens system and object lens system through each of the air guiding tubes 29 and 31 is installed in a rearward portion of the filtering member 33.

Furthermore, a heater coil 37 is installed in a downstream side of the blowing device 35 along the flow direction of air in order to heat the air received from the outside.

Herein, the above heater coil 37 may be arranged in an upstream side of the blowing device 35.

Figure 2:
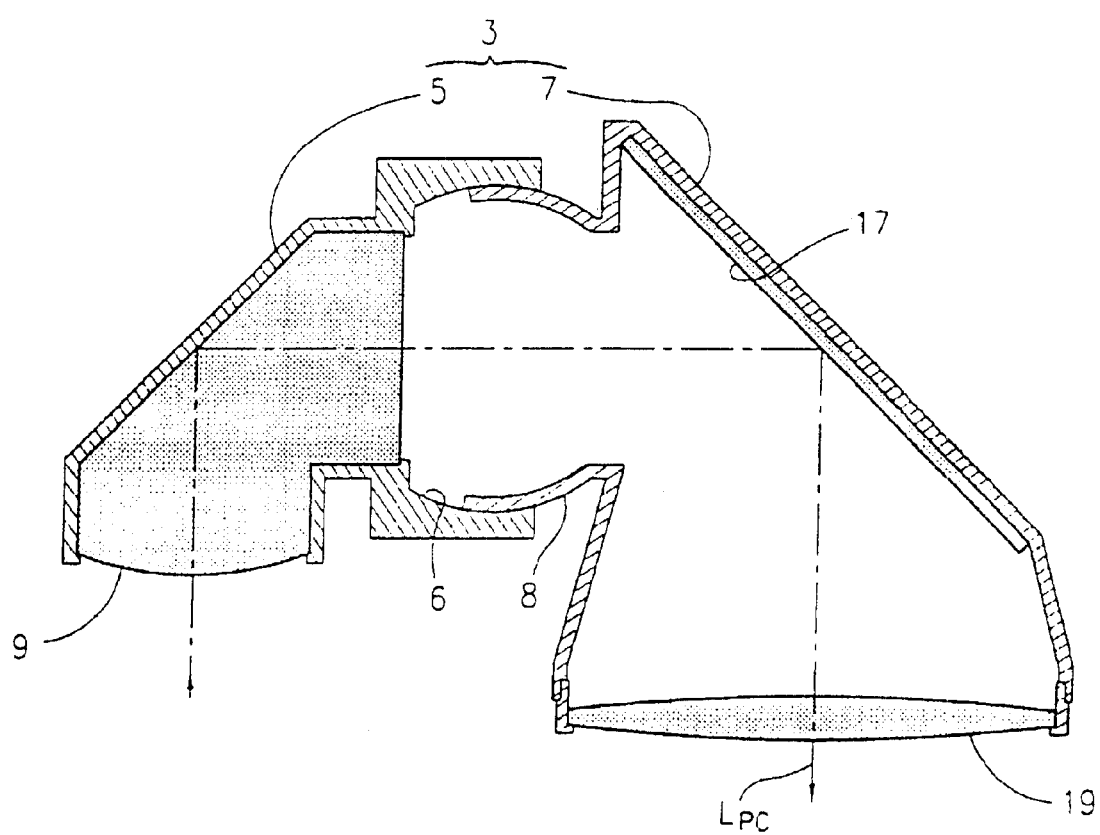
FIG. 2 is a plane cross-sectional view of a lumbar portion a sideview mirror for vehicles according to the embodiment of the present invention.
Figure 3:
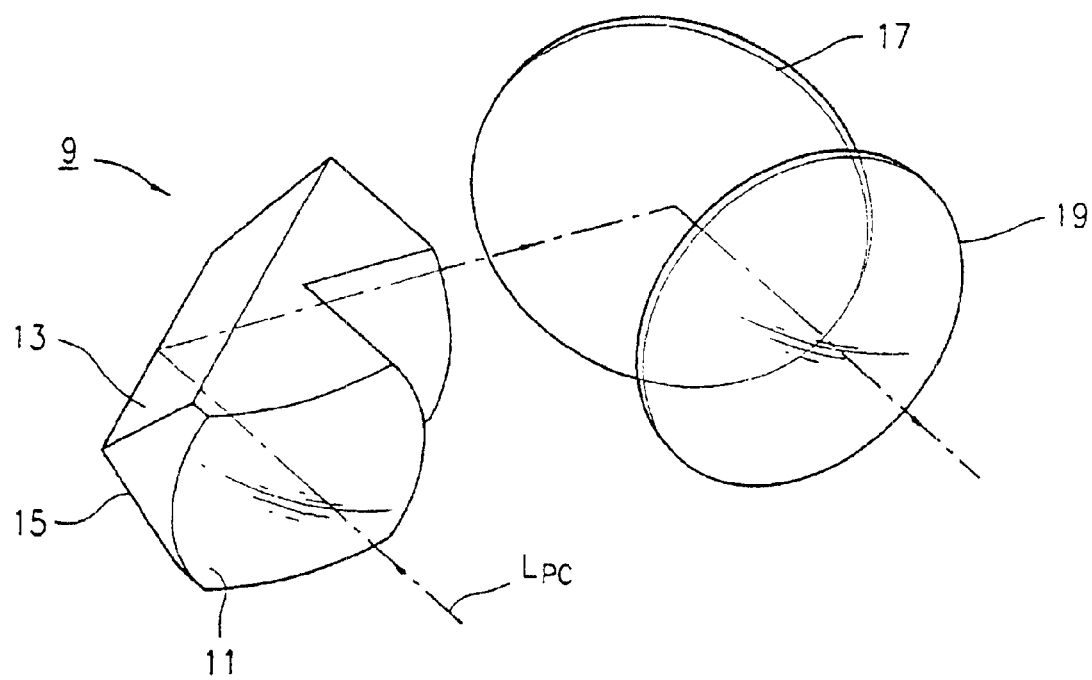
FIG. 3 is a perspective view illustrating the arrangement state of optical elements according to the embodiment of the present invention.
Figure 4:
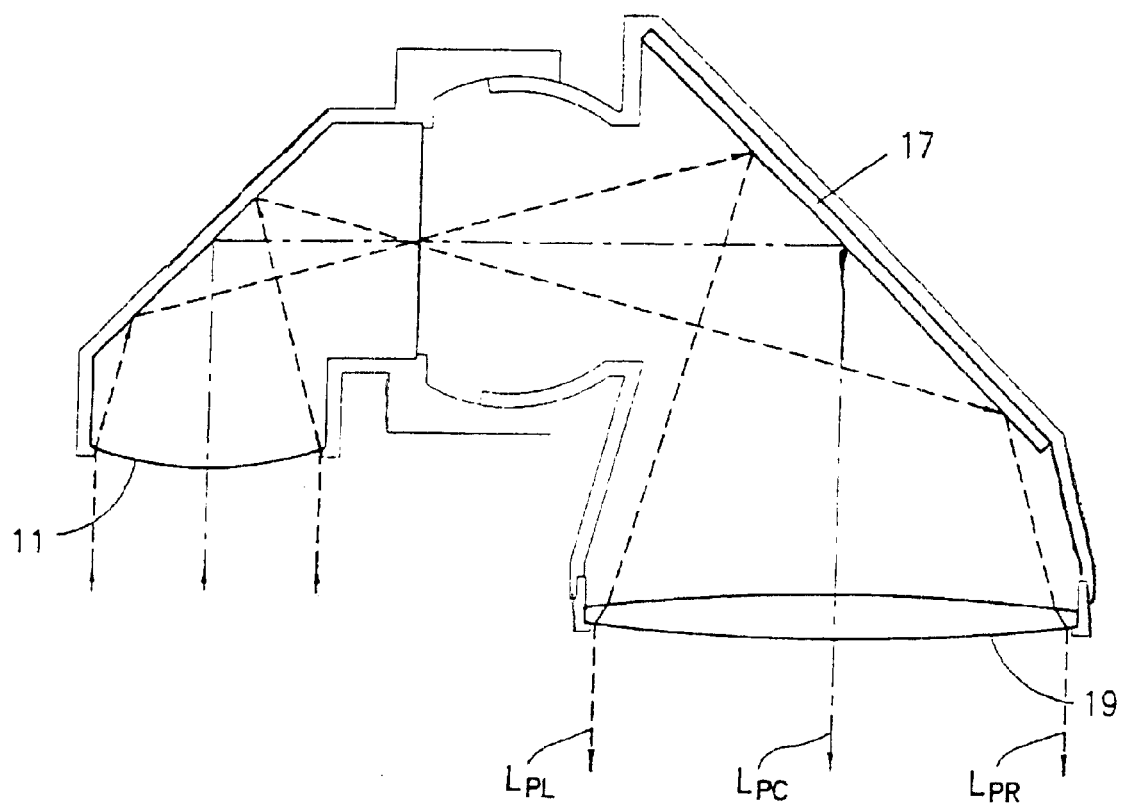
FIG. 4 is a explanatory view illustrating an optical path of the optical elements according to the embodiment of the present invention.
Figure 5:
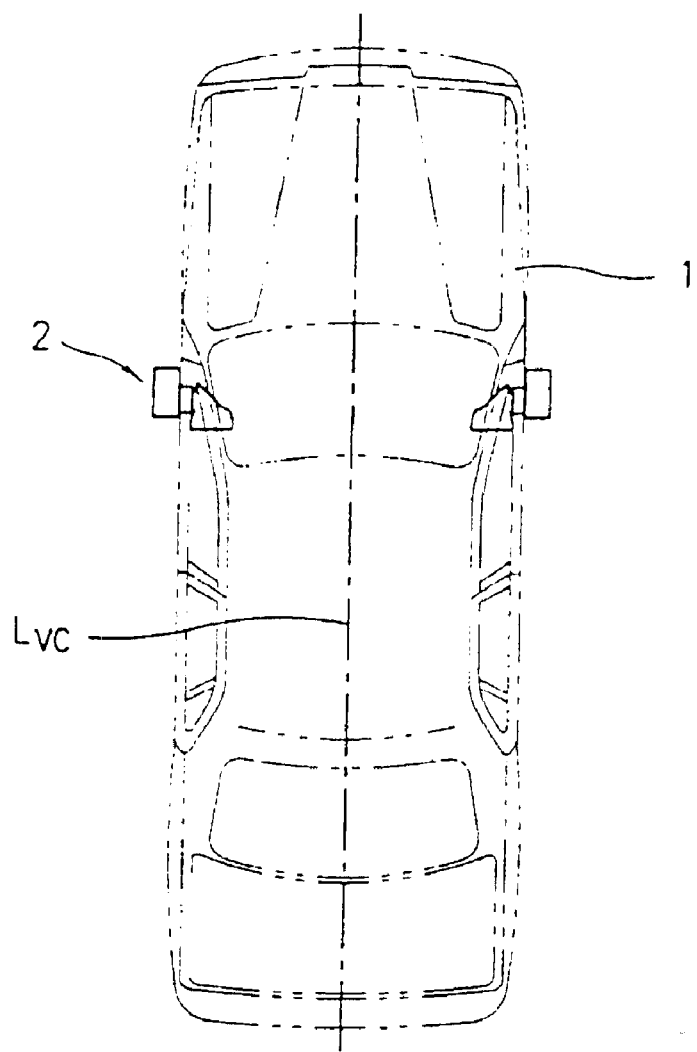
FIG. 5 is a view illustrating the state of using a sideview mirror for vehicles according to the present invention.

FIG. 2 is a plane cross-sectional view of a lumbar portion a sideview mirror for vehicles according to the embodiment of the present invention. FIG. 3 is a perspective view illustrating the arrangement state of optical elements according to the embodiment of the present invention. FIG. 4 is a explanatory view illustrating an optical path of the optical elements according to the embodiment of the present invention. FIG. 5 is a view illustrating the state of using a sideview mirror for vehicles according to the present invention.

As shown in these drawings, the object lens system has an optical transmission member 9 arranged inside the outer tubular unit 5 and adapted to refract and reflect an image at the rear of the vehicle 1 to be converged on the interior of the vehicle 1.

The optical transmission member 9 is configured as a so-called Amici type prism wherein an object lens of a convex lens type for refracting a passed ray to be converged; an upper reflecting unit 13 arranged at a predetermined angle (45 degree in this embodiment) within the focal length of the object lens 11 and adapted to reflect the ray passing through an upper side of the horizontal center line of the object lens 11; and a lower reflecting unit 15 arranged within the focal length of the object lens 11 so that the upper reflecting unit 13 is at a right angle with the internal angle and a reciprocal contact line corresponds to the horizontal center line of the object lens 11 and adapted to reflect the ray passing through a lower portion of the horizontal center line of the object lens 11 are integrally formed.

The eye lens system includes an eye lens of a convex lens type arranged in an inner aperture portion of the inner tubular unit 7 and adapted to magnify and refract the image incident through the optical transmission member 9 to form an image having either unit magnification or a predetermined magnification and a third reflecting unit 17 of a planar reflector type or a prism arranged between the optical transmission member 9 and the object lens 19 and adapted to reflect the image received from the optical transmission member 9.

Herein, the third reflecting unit 17 can be configured as a planar reflector arranged beyond the focal length of the object lens 11 so that the optical path (LPL, LPR) reflected by the upper reflecting unit 13 and the lower reflecting unit 15 cross each other, and can be configured as a prism.

In addition, the eye lens 19 is configured as a single convex lens. However, according to the distance between the sideview mirror and the driver, that is, in the case where the sideview mirror is relatively far from the driver, for example, the sideview mirror at the passenger's side, a plano-convex lens can be installed in a forward aperture portion of the inner tubular unit 7 and a concave-convex lens can be installed between the plano-convex lens and the third reflecting unit 17.

In the above optical transmission member 9, the object lens 11, upper reflecting unit 13, and lower reflecting unit 15 are integrally formed. However, the object lens 11, upper reflecting unit 13, and lower reflecting unit 15 can be configured independently, or the upper reflecting unit 13 and the lower reflecting unit 15 are integrally formed while the object lens formed independently is arranged at one side thereof.

In addition, although the third reflecting unit 17 and the eye lens 19 are formed independently, it is also possible to form the third reflecting unit 17 and the eye lens 19 integrally with each other.

The operation of the sideview mirror according to the present invention thusly constructed will now be described.

Firstly, when the image of an object at the rear of the vehicle connected with the housing 3 passes through the object lens 11 in the form of an almost parallel ray, the upper reflecting unit 13 reflects the ray incident through an upper portion of the horizontal center line of the object lens 11 on the lower reflecting unit 15 at a reflection angle corresponding to the incident angle, and the lower reflecting unit 15 reflects the same to the third reflecting unit 17.

At the same time, the lower reflecting unit 15 reflects the ray incident through a lower portion of the horizontal center line of the object lens 11 on the upper reflecting unit 13 at a predetermined reflection angle, and the upper reflecting unit 13 reflects the same to the third reflecting unit 17 at a reflection angle corresponding to the incident angle.

Accordingly, the rays reflected by the upper reflecting unit 13 and the lower reflecting unit 15, respectively, are crossed with each other at the focal point of the object lens, and thus an image formation is achieved on the third reflecting unit in a state that the lateral and longitudinal portions of the image are corrected.

The ray reflected by the third reflecting unit 17 passes through the eye lens 19 constructing the afocal optical system along with the optical transmission member 9, is magnified to form an image having either unit magnification or a predetermined magnification, and is transmitted to the driver in the form of an almost parallel ray, thereby making the driver see the view at the rear without distortion accurately and easily.

Meanwhile, in the case where water drops or frost are formed on the surface of the object lens 11 or eye lens 19 while the vehicle moves, when the air inlet 25 is opened by the opening and closing device (not shown) of the air inlet 25, air enters the air guiding tube 27.

The air entering the air guiding tube 27 is filtered through the filtering member 33, and is injected on the surface of the object lens 11 and eye lens 19 via the first branching pipe 29 and second branching pipe 31, respectively, thereby removing water drops or frost on the surface of the object lens 11 and eye lens 19.

On the contrary, in the case where the vehicle 1 is stopped, air is guided from the outside by applying power to the blowing device 35, for thereby enabling the guided air to be injected on the surface of the object lens and eye lens 19 via the branching pipes 29 and 31, respectively.

Furthermore, in the case where ice is formed on the surface of the object lens 11 at a relatively low outdoor temperature in winter, power is applied to the heater coil 37 to thus heat air, and the heated air is injected on the surface of the object lens 11, thereby easily removing ice formed on the surface.

Meanwhile, the angle adjusting device of a sideview mirror capable of using the sideveiw mirror thusly constructed and operated according to the embodiment of the present invention by automatically or manually adjusting the angle of the sideveiw mirror according to the physical conditions of the driver will now be described according to the embodiment as shown in the accompanying drawings.

Figure 6:
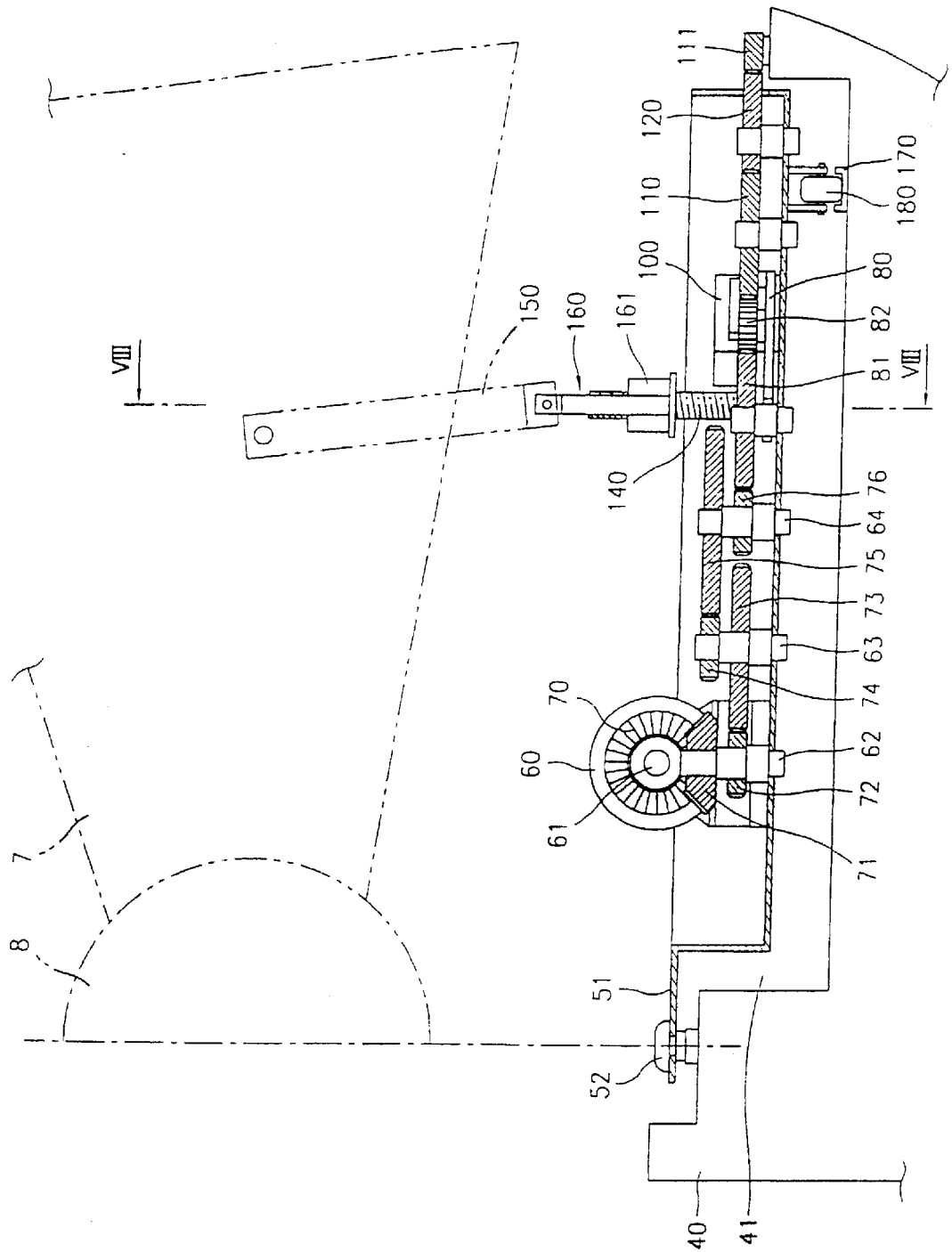
FIG. 6 is a side cross-sectional veiw illustrating a sideview mirror angle adjusting device for automatically adjusting the angle of a sideview mirror in a vertical direction and in a horizontal direction.
Figure 7:
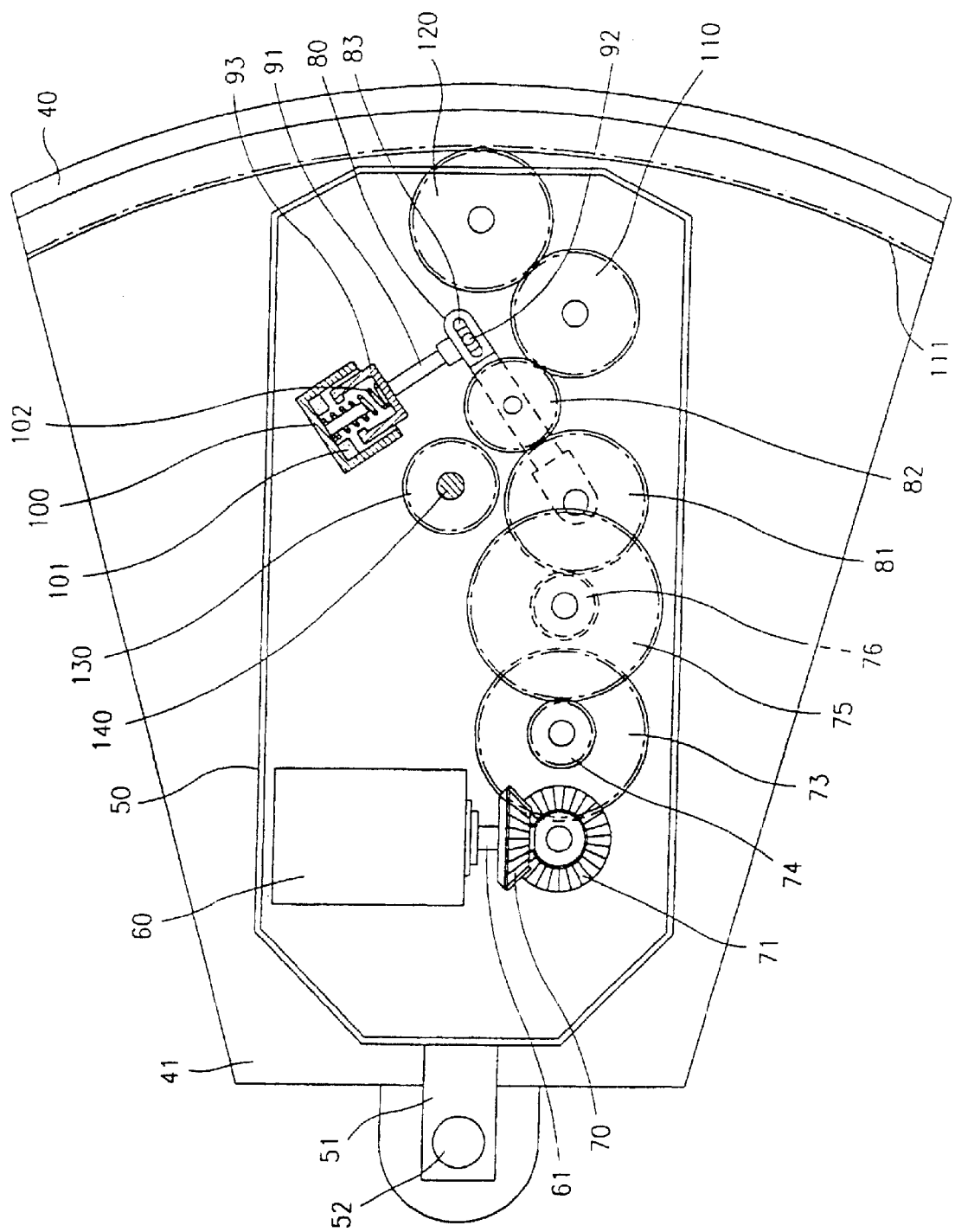
FIG. 7 is a plane view illustrating a sideview mirror angle adjusting device for automatically adjusting the angle of the sideview mirror according to the present invention.
Figure 8:
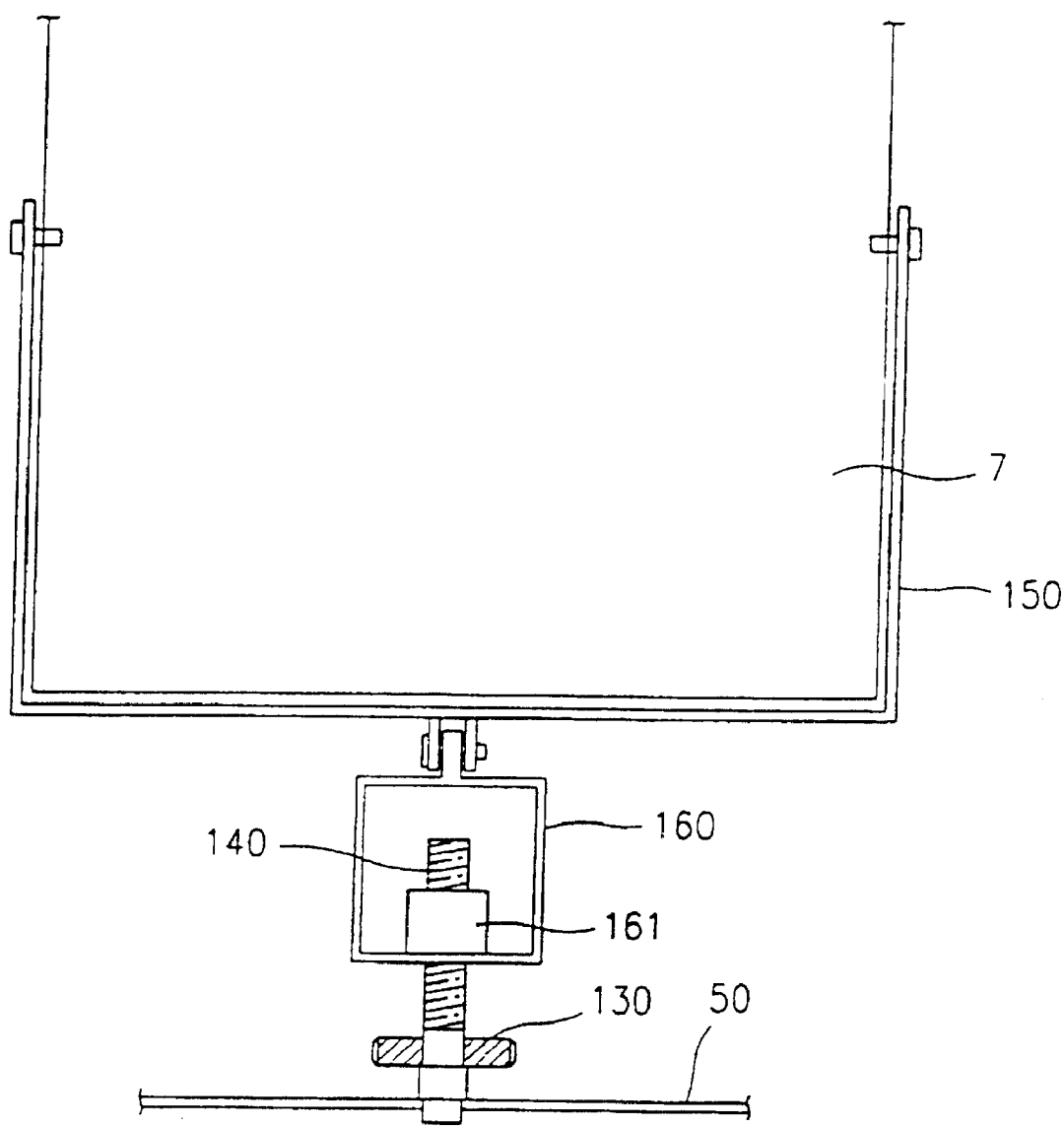
FIG. 8 is a cross-sectional view taken along line VIII—VIII of FIG. 6.

Firstly, FIG. 6 is a side cross-sectional view illustrating an angle adjusting device of a sideview mirror for automatically adjusting the angle of a sideview mirror in a vertical direction and in a horizontal direction. FIG. 7 is a plane view illustrating an angle adjusting device of a sideview mirror for automatically adjusting the angle of the sideview mirror according to the present invention. FIG. 8 is a cross-sectional view taken along line VIII—VIII of FIG. 6;

A mounting groove 41 is formed within a door panel 40 mounted inside the driver's door and the passenger's door of the vehicle, an auto driving box 50 is installed inside the mounting groove 41, and accordingly a supporting bracket 51 formed at one end of the auto driving box 50 is rotatably connected to the door panel 40 by a fixing pin 52.

A motor 60 for driving during automatic adjusting of the sideview mirror 2 is mounted at one side of the interior of the auto driving box 50, and a driving gear 70 configured as a bevel gear is installed at the end of a motor axis 61 rotating by the driving power of the motor 60.

In addition, at one side of the driving gear 70, a first reduction gear 71 configured as a bevel gear engaging with the driving gear 70 in order to reduce the rotating power of the driving gear 70 and a second reduction gear 72 configured as a plain gear are rotatably installed at upper and lower sides of a first supporting axis 62, respectively. At the other side thereof, a third reduction gear 73 engaging with the second reduction gear 72 is installed at a lower side of a second supporting axis 63, and a fourth reduction gear 74 is installed at an upper side of the second supporting axis 63.

In addition, at one side of the third and fourth reduction gears 73 and 74, a fifth reduction gear 75 engaging with the fourth reduction gear 74 is rotatably installed at an upper side of the third supporting axis 64, and a sixth reduction gear 76 is rotatably installed at a lower side of the third supporting axis 64.

In addition, at one side of the fifth reduction gear 75 and sixth reduction gear 76, a power conversion link 80 rotating during automatic adjusting of the angle of a sideview mirror 2 is installed. At an upper side of the power transmission link 80, first and second relay gears 81 and 82 engaging with the sixth reduction gear 76 to be rotated by rotating power are installed to be engaged with each other. At the end portion of the power conversion link 80, a long guiding hole 83 is formed. One end of a guiding member 91 for guiding rotation is connected to the long guiding hole 83 by a fixing pin 92, and an operating flap 93 is constructed on the other end of the guiding member 91.

In the opposite side of the operating flap 93, a clutch box 100 into which the operating flap 93 is inserted is installed. Inside the clutch box 100, an electromagnet 101 contacted by the operating flap 93 as power is applied during vertical (longitudinal) adjusting of the angle of the sideview mirror 2 is attached. Between the operating flap 93 and the interior of the clutch box 100, a spring 102 for providing springback force to the operating flap 93 when the power transmitted to the electromagnet 101 is turned off is installed.

In addition, at one side of the second relay gear 82 installed at the upper side of the power conversion link 80, a horizontal power transmission gear 110 engaging with the second relay gear 82 to be rotated by rotating power during horizontal adjusting of the angle of the sideview mirror 2 is installed. At one side of the horizontal power transmission gear, a horizontal adjusting gear 120 engaging between the horizontal power transmission gear 110 and a horizontal rack gear 111 formed in the door panel 40 to be rotated by the rotating power of the horizontal power transmission gear 110 in order to adjust the angle of the sideview mirror 2 by moving along the horizontal rack gear 111 is installed.

In addition, at the other side of the second relay gear 82 installed at the upper side of the power conversion link 80, a vertical power transmission gear 130 engaging with the second relay gear 82 to be rotated by the rotating gear during vertical adjusting of the angle of the sideview mirror 2. At the center of the vertical power transmission gear 130, a vertical rotating axis 140 rotated by the rotating power of the vertical power transmission gear 130 is installed. At the vertical rotating axis 140, a vertical adjusting member 160 is installed, of which the upper end portion is hingeably connected to the center of a lower portion of a connecting member 150 installed at the inner tubular unit 7 of the sideview mirror 2 and in which a guide ring 161 penetrated by the vertical rotating axis 140 to be engaged therewith is fixed for thereby raising and lowering the inner tubular unit 7 by the rotation of the vertical rotating axis 140.

In addition, a guide rail 170 is installed at the bottom surface in a forward portion of the mounting groove 41 formed inside the door panel 40. At a lower side of the auto driving box 50 facing to the guide rail 170, a roller 180 for guiding horizontal movement of the auto driving box 50 along the guide rail 170 and supporting the auto driving box 50 at a predetermined height is rotatably installed.

The operation of the automatic angle adjusting device of a sideview mirror thusly constructed will now be described.

When an user press a switch (not shown) attached to a adjusting panel at the driver's side for automatically adjusting the sideview mirror laterally, the motor 60 in the auto driving box 50 installed within the mounting groove 41 inside the door panel mounted inside a door (not shown) is driven, and accordingly the motor axis 61 is rotated in a clockwise or counterclockwise direction.

At the same time, at the end portion of the motor axis 61, the driving gear 70 configured as a bevel gear is rotated by the rotating power of the motor axis 61, and the first reduction gear 71 configured as a bevel gear vertically crossing the driving gear 70 to be engaged with each other is rotated by rotating power. At the same time, the second reduction gear 72 at the lower side of the first reduction gear 71, third reduction gear 73 engaging with the second reduction gear 72, fourth reduction gear 74 installed at the upper side of the third reduction gear 73, fifth reduction gear 75 engaging with the fourth reduction gear 74, and sixth reduction gear 76 installed at the lower side of the fifth reduction gear 75 are sequentially rotated in a state that the rotating power of the driving gear 70 is reduced.

At this time, of the first and second relay gears 81 and 82 rotatably installed at the upper side of the power conversion link 80 and engaged with the sixth reduction gear 76 to be rotated by rotating power, the horizontal power transmission gear 110 is engaged with one side of the second relay gear 82 for thereby receiving the rotating power of the second relay gear 82. The vertical power transmission gear 130 installed at the other side of the second relay gear 82 is spaced apart therefrom, so it cannot receives the rotating power of the second relay gear 82.

Therefore, the horizontal power transmission gear 110 and the horizontal adjusting gear 120 receiving the rotating power of the second relay gear 82 are rotated, and at the same are moved laterally along the horizontal rack gear 111 of the door panel 40 engaged with the horizontal adjusting gear 120, thereby making it possible to automatically adjusting the inner tubular unit 7 of the sideview mirror 2 in a horizontal direction.

Meanwhile, when the user press a switch (not shown) attached to a adjusting panel at the driver's side for manually adjusting the sideview mirror in a vertical direction, the motor 60 in the auto driving box 50 installed within the mounting groove 41 inside the door panel 40 mounted inside a door (not shown) is driven, and accordingly the motor axis 61 is rotated in a clockwise or counterclockwise direction.

At the same time, at the end portion of the motor axis 61, the driving gear 70 configured as a bevel gear is rotated by the rotating power of the motor axis 61, and the first reduction gear 71 configured as a bevel gear vertically crossing the driving gear 70 to be engaged with each other is rotated by rotating power. At the same time, the second reduction gear 72 at the lower side of the first reduction gear 71, third reduction gear 73 engaging with the second reduction gear 72, fourth reduction gear 74 installed at the upper side of the third reduction gear 73, fifth reduction gear 75 engaging with the fourth reduction gear 74, and sixth reduction gear 76 installed at the lower side of the fifth reduction gear 75 are sequentially rotated in a state that the rotating power of the driving gear 70 is reduced.

At this time, as power is applied to the electromagnet 101 attached to the interior of the clutch box 100 while the motor 60 is driven, the operating flap 93 formed at the other side of the guiding member 91 is adhered to the electromagnet by attraction, whereby the guiding member 91 and the power conversion link 80 moves toward the vertical power transmission gear 130 in a state that the second relay gear 82 is spaced apart from the vertical power transmission gear 130.

At the same time, since the second relay gear 82 is engaged with the vertical power transmission gear 130, the vertical power transmission gear 130 received the rotating power of the second relay gear 82. On the other hand, the horizontal power transmission gear 110 is space apart from the second relay gear 82, it cannot receive the rotating power of the second relay gear 82.

Therefore, the vertical rotating axis 140 installed at the center of the vertical power transmission gear 130 is rotated while the vertical power transmission gear 130 is rotated. At the same time, since the vertical adjusting member 160 of which the upper end portion is hingeably connected to the center of a lower end of the connecting member 150 installed in the inner tubular unit 7 of the sideview mirror 2 and in which the guide ring 161 penetrated by the vertical rotating axis 140 to be engaged therewith is fixed to the vertical adjusting member 160 rises or falls along the vertical rotating axis 140, it is possible to automatically adjust the inner tubular unit 7 of the sideview mirror 2 in the vertical direction.

The above is the description of the construction and operation for automatically adjusting the angle of the sideview mirror according to the present invention.

Meanwhile, the angle adjusting device of a sideview mirror for manually adjusting the angle of the sideview mirror of the present invention will now be described according to the embodiment as shown in the accompanying drawings.

Figure 9:
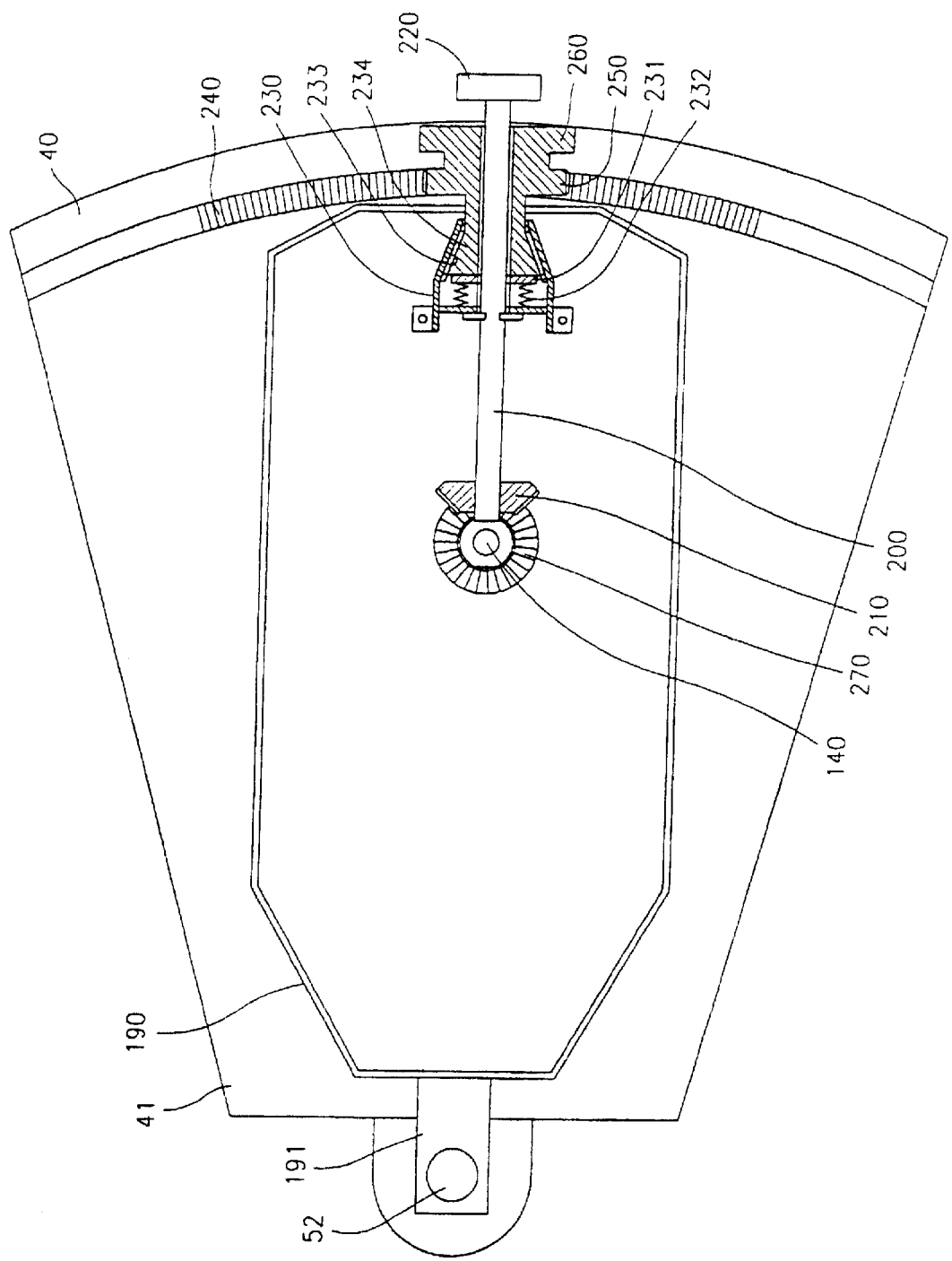
FIG. 9 is a plane view illustrating a sideveiw mirror angle adjusting device for manually adjusting the angle of the sideview mirror according to the present invention.
Figure 10:
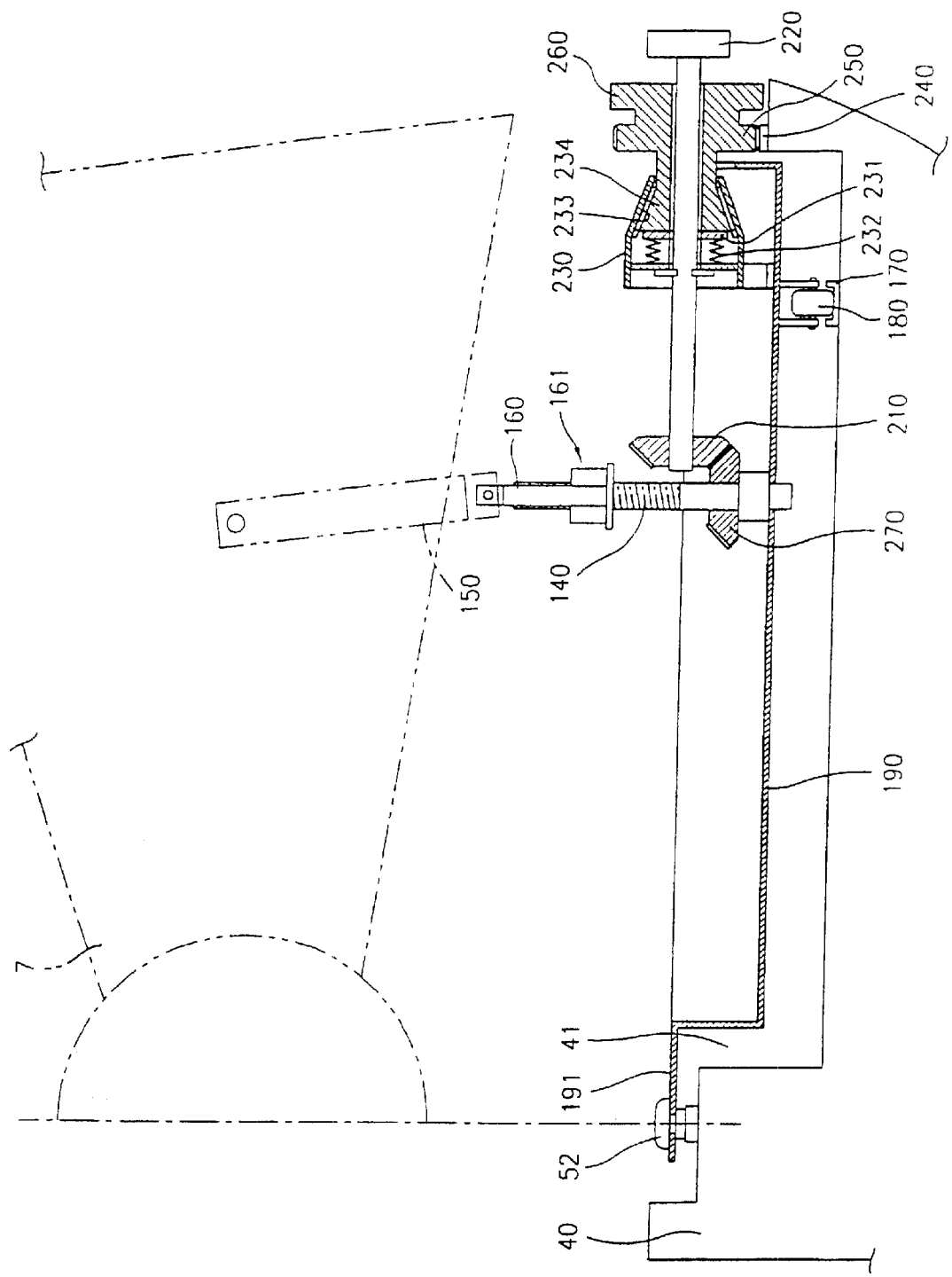
FIG. 10 is a side view of an manual sideview mirror angle adjusting device for manually adjusting the angle of the sideview mirror according to the present invention.

FIG. 9 is a plane view of a manual angle adjusting device of a sideview mirror for manually adjusting the angle of the sideview mirror according to the present invention, and FIG. 10 is a side view of a manual angle adjusting device of a sideview mirror for manually adjusting the angle of the sideview mirror according to the present invention.

As illustrated therein, a mounting groove 41 is formed inside the door panel 40 mounted within the door of the vehicle, and a manual adjusting box 190 is installed inside the mounting groove 41, whereby a supporting bracket 191 installed at one end of the manual adjusting box 190 is rotatably connected to the door panel 40 by a fixing pin 52.

In addition, an adjusting axis 200 is mounted within the manual adjusting box 190 in a longitudinal direction, and a vertical driving gear 210 configured as a bevel gear rotating by the rotating power of the adjusting axis 200 during adjusting of the vertical angle is installed, and a vertical adjusting handle 220 hold during adjusting of the vertical angle is formed at the other end of the adjusting axis 200 outside the door panel 40.

In addition, a horizontal flow preventing unit 230 of a cone-type is installed at the bottom surface of the manual adjusting box 190, a spring receiver 231 is installed inside the horizontal flow preventing unit 230, a spring 232 is installed between the interior of the horizontal flow preventing unit 230 and the spring receiver 231, and a spiral groove 233 is formed on the inner circumferential surface of the horizontal flow preventing unit 230.

In addition, a cone-type friction gear 234 is inserted into the horizontal flow preventing unit 230 to be engaged with the spiral groove 233.

At the rear of the friction gear 234, a horizontal adjusting gear 250 engaging with a horizontal rack gear 240 formed at the door panel 40 is formed. At the rear of the horizontal adjusting gear 250, a horizontal adjusting handle 260 for rotating the horizontal adjusting gear 250 by holding during adjusting of the horizontal angle of the sideview mirror 2 is formed.

In addition, at the vertical driving gear 210, a vertical power transmission gear 270 configured as a bevel gear engaged with the vertical driving gear 210 to be rotated by the rotating power thereof during adjusting of the vertical angle of the sideview mirror 2 is installed so that it vertically cross the vertical driving gear 210. At the center of the vertical power transmission gear 270, a vertical rotating axis 140 rotated by the rotating power of the vertical power transmission gear 270 is installed. At the vertical rotating axis 140, a vertical adjusting member 160 of which an upper end portion is hingeably connected to the center of a lower end of a connecting member 150 installed in the inner tubular unit 7 of the sideview mirror 2 and in which a guide ring 161 penetrated by the vertical rotating axis 140 to be engaged therewith is fixed for thereby raising and lowering the inner tubular unit 7 by rotation of the vertical rotating axis 140.

The operation of the thusly constructed manual angle adjusting device of a sideview mirror will now be described.

When the user intends to manually adjust the sideview mirror in order to move the same laterally, the spring 232 installed between the horizontal flow preventing unit 230 and the spring receiver 231 is compressed by slightly pushing the horizontal adjusting handle 260 in a forward direction.

At the same time, the connection between the spiral groove 233 on the circumferential surface of the horizontal flow preventing unit 230 and the friction gear 234 in a forward portion of the horizontal adjusting handle 160 is released. Thus, when the horizontal adjusting handle 260 is rotated in a clockwise or counterclockwise direction, the horizontal adjusting gear 250 integrally formed in a forward portion of the horizontal adjusting handle 260 to be engaged with the horizontal rack gear 240 formed on the door panel 40 is rotated in the clockwise or counterclockwise direction, thereby making it possible to adjust the sideview mirror 2 laterally.

In addition, when the user intends to manually adjust the sideview mirror 2 in order to raise or lower the same, the vertical driving gear 210 installed at one end of the adjusting axis 200 is rotated by rotating power in a state of being engaged with the vertical power transmission gear 270 vertically crossing the vertical driving gear 210 by rotating the vertical adjusting handle 220 installed at the other hand of the adjusting axis 200 in the clockwise or counterclockwise direction.

At the same time, while the vertical rotating axis 140 installed at the center of the vertical power transmission gear 270 is rotated, the vertical adjusting member 160 of which the upper end portion is hingeably connected to the center of a lower end of the connecting member 150 installed in the inner tubular unit 7 of the sideview mirror 2 and in which the guide ring 161 penetrated by the vertical rotating axis 140 to be engaged therewith is fixed rises or falls along the vertical rotating axis 140. Thus, it is made possible to manually adjust the inner tubular unit 7 of the sideview mirror 2 in the vertical direction.

As described above, the sideview mirror for vehicles according to the present invention has an effect of accurately and easily viewing an object without distortion by making the driver see the view at the rear at unit magnification with respect to the movement direction of the vehicle.

In addition, in the sideview mirror for vehicles according to the present invention, it is easy to making the driver's eye consistent with an optical axis, flickering of an image due to the vibration of the vehicle is less occurred, and an image of an almost parallel ray from an object is recognized through the object lens and eye lens constructing the afocal system, thereby making the driver easily view the rear of the vehicle.

Furthermore, according to the present invention, since the angle of the sideview mirror for vehicles can be automatically adjusted according to the physical conditions of the driver, the driver can always drive the vehicle safely, thereby enhancing the safety and reliability of the vehicle.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A sideview mirror for vehicles, comprising:
   a housing connected to a forward portion of a driver's side of a vehicle so that a first aperture formed at one side of the housing is arranged outside the vehicle and is directed to an outer rearward portion of the vehicle and a second aperture at an other side of the housing is arranged inside the vehicle;
   an object lens system including:
      at least one object lens of a convex lens type connected to the first aperture,
      an upper reflecting unit arranged in the housing at a predetermined angle within a focal length of the object lens so as to reflect a first ray passing through an upper portion of a horizontal center line of the object lens to an interior of the vehicle, and a lower reflecting unit arranged in the housing so that the upper reflecting unit is at a right angle with respect to the lower reflecting unit and a contact line located at an intersection of the lower reflecting unit and the upper reflecting unit corresponds to the horizontal center line of the object lens and the lower reflecting unit is adapted to reflect a second ray passing through a lower portion of the horizontal center line of the object lens; and an eye lens system having:

a third reflecting unit arranged beyond the focal length of the object lens and adapted to reflect the first and second rays to the second aperture of the housing, and at least one eye lens of a convex lens type connected to the second aperture of the housing and adapted to magnify and refract the first and second rays reflected by the third reflecting unit to form an image having either an unit magnification or a predetermined magnification for thereby forming an afocal system.

2. The sideview mirror for vehicles according to claim 1, wherein the upper reflecting unit and the lower reflecting unit are Amici type prisms integral with each other.

3. The sideview mirror for vehicles according to claim 1, wherein the object lens, upper reflecting unit, and lower reflecting unit are Amici type prisms integral with one another.

4. The sideview mirror for vehicles according to claim 1, wherein the third reflecting unit is a planar reflector.

5. The sideview mirror for vehicles according to claim 1, wherein the third reflecting unit and the eye lens are integral with each other.

6. The sideview mirror for vehicles according to claim 5, wherein the third reflecting unit is a prism.

7. The sideview mirror for vehicles according to claim 1, wherein the eye lens includes a plano-convex lens arranged in the second aperture of the housing and a concave-convex lens arranged between the plano-convex lens and the third reflecting unit.

8. The sideview mirror for vehicles according to claim 1, wherein the housing includes an outer tubular unit having a spherical unit at one end exposed to the interior of the vehicle to be connected thereto and an inner tubular unit pivotably connected to the spherical unit.

9. The sideview mirror for vehicles according to claim 8, wherein the sideview mirror for vehicles further includes an outer duct connected to a circumference of the outer tubular unit to surround the same and having an air inlet formed at one end and a first branching pipe for guiding air introduced through the outer duct to a surface of the object lens.

10. The sideview mirror for vehicles according to claim 9, wherein the sideview mirror for vehicles further includes an inner duct connected to a circumference of the inner tubular unit to surround the same and of which one end is communicated with the outer duct and a second branching pipe for guiding air introduced through an air inlet to the surface of the eye lens arranged in the second aperture of the housing.

11. The sideview mirror for vehicles according to claim 9, the sideview mirror for vehicles further includes a heating unit arranged in a flow channel of the air introduced through the air inlet and adapted to heat the air.

12. The sideview mirror for vehicles according to claim 9, the sideview mirror for vehicles further includes a blower arranged in the outer tubular duct and adapted to enable air from outside the vehicle to be introduced into the outer duct through the air inlet.

13. A sideview mirror for vehicles, comprising:

a housing connected to a forward portion of a driver's side of a vehicle so that a first aperture formed at one side of the housing is arranged outside the vehicle and is directed to an outer rearward portion of the vehicle and a second aperture at an other side of the housing is arranged inside the vehicle;

an object lens of a convex lens type arranged in the first aperture;

an Amici type prism including:

an upper reflecting surface arranged at a predetermined angle within a focal length of the object lens so as to reflect a first ray passing through an upper portion of a horizontal center line of the object lens to the interior of the vehicle, and a lower reflecting surface arranged so that the upper reflecting surface is at a right angle with respect to the lower reflecting surface and a contact line located at an intersection of the lower reflecting unit and the upper reflecting unit corresponds to the horizontal center line of the object lens and the lower reflecting unit is adapted to reflect a second ray passing through a lower portion of the horizontal center line of the object lens, wherein the upper reflecting surface and the lower reflecting surface are integral with each other;

a planar reflector arranged beyond the focal length of the object lens and adapted to reflect the first and second rays reflected by the prism to the second aperture of the housing; and an eye lens system of a convex lens type connected to the second aperture of the housing and adapted to magnify and refract the first and second rays reflected by the planar reflector to form an image having unit magnification for thereby forming an afocal system.

14. A sideview mirror for vehicles, comprising:

a housing connected to a forward portion of a driver's side of a vehicle so that a first aperture formed at one side of the housing is arranged outside the vehicle and is directed to an outer rearward portion of the vehicle and a second aperture at an other side of the housing is arranged inside the vehicle;

an optical transmission member including:

an object lens of a convex lens type arranged in the first aperture, an upper reflecting surface arranged at a predetermined angle within a focal length of the abject lens so as to reflect a first ray passing through an upper portion of a horizontal center line of the object lens to an interior of the vehicle, and a lower reflecting surface arranged so that the upper reflecting surface is at a right angle with respect to the lower reflecting surface and a contact line located at an intersection of the lower reflecting surface and the upper reflecting surface corresponds to the horizontal center line of the object lens and the lower reflecting surface is adapted to reflect a second ray passing through a lower portion of the horizontal center line of the object lens, wherein the upper reflecting surface and the lower reflecting surface are integral with one another;

a planar reflector arranged beyond the focal length of the object lens and adapted to reflect the first and second rays passing through the optical transmission member to the second aperture of the housing; and an eye lens system of a convex lens type connected to the second aperture of the housing and adapted to magnify and refract the first and second rays reflected by the planar reflector to form an image having unit magnification for thereby forming an afocal system.

15. A sideview mirror for vehicles, comprising;
a housing connected to a forward portion of a driver's side of a vehicle so that a first aperture formed at one side of the housing is arranged outside the vehicle and is directed to an outer rearward portion of the vehicle and a second aperture at an other side of the housing is arranged inside the vehicle;
an object lens of a convex lens type arranged in the first aperture;
a reflector including:
   an upper planar reflecting surface arranged at a predetermined angle within a focal length of the object lens so as to reflect a first ray passing through an upper portion of a horizontal center line of the object lens to an interior of the vehicle, and
   a lower planar reflecting surface arranged so that the upper planar reflecting surface is at a right angle with respect to the lower planar reflecting surface and a contact line located at an intersection of the lower planar reflecting surface and the upper planar reflecting surface corresponds to the horizontal center line of the object lens and the lower planar reflecting surface is adapted to reflect a second ray passing through a lower portion of the horizontal center line of the object lens, wherein the upper planar reflecting surface and the lower planar reflecting surface are integral with each other;
a planar reflector arranged beyond the focal length of the object lens and adapted to reflect the first and second rays passing through the object lens and through the reflector to the second aperture of the housing; and
an eye lens system of a convex lens type connected to the second aperture of the housing and adapted to magnify and refract the first and second rays reflected by the planar reflector to form an image having unit magnification for thereby forming an afocal system.

16. An angle adjusting device of a sideview mirror for vehicles, comprising a device capable of automatically or manually adjusting a horizontal and a vertical angle of the sideview mirror for vehicles according to claim 1.

17. The device according to claim 16, wherein the angle adjusting device of a sideview mirror for vehicles comprises:
an auto driving box of which one end portion is rotatably mounted in a door panel of a driver's seat and passenger's seat and adapted to interlock an inner tubular unit of a sideview mirror housing;
a driving source mounted within the auto driving box and adapted to be driven in order to transmit driving power during automatic adjusting of the horizontal angle and the vertical angle of the inner tubular unit of the housing;
a horizontal driving unit driven by the driving power of the driving source during adjusting of the horizontal angle of the inner tubular unit of the housing;
a vertical driving unit driven by the driving power of the driving source during adjusting of the vertical angle of the inner tubular unit of the housing; and
a clutch unit having one or more relay gears for selectively interrupting the driving power transmitted between the horizontal and vertical driving units.

18. The device according to claim 17, wherein the horizontal driving unit comprises:
a driving gear installed at an end of an axis of a motor that is the driving source and adapted to be rotated by rotating power of the motor axis;
a horizontal power transmission gear rotated by the rotating power transmitted from the driving gear, a plurality of reduction gears, and the clutch unit in order to adjust the horizontal angle of the inner tubular unit of the housing; and
a horizontal adjusting gear installed to be engaged between the horizontal power transmission gear and a horizontal rack gear formed at the door panel and adapted to be rotated by the rotating power from the horizontal power transmission gear in order to adjust the horizontal angle of the inner tubular unit of the housing toward a horizontal direction by moving along the horizontal rack gear.

19. The device according to claim 17, wherein the vertical driving unit comprises:
a driving gear installed at an end of an axis of a motor that is a driving source and adapted to be rotated by rotating power of the motor axis;
a vertical power transmission gear rotated by the rotating power transmitted from the driving gear, a plurality of reduction gears, and the clutch unit in order to adjust the vertical angle of the inner tubular unit of the housing;
a vertical rotating axis installed in a center of the vertical power transmission gear and adapted to be rotated by the rotating power from the vertical power transmission gear; and
a vertical adjusting member of which an upper end portion is hingeably connected to a center of a lower end of a connecting member installed in the inner tubular unit of the housing and in which a guide ring penetrated by the vertical rotating axis to be engaged therewith is fixed for thereby raising and lowering the inner tubular unit of the housing by rotation of the vertical rotating axis.

20. The device according to claim 17, wherein:
the horizontal driving unit includes:
   a driving gear installed at an end of an axis of a motor tat is the driving source and adapted to be rotated by rotating power of the motor axis; and
   a horizontal power transmission gear rotated by the rotating power transmitted from the driving gear, a plurality of reduction gears, and the clutch unit in order to adjust the horizontal angle of the inner tubular unit of the housing;
the vertical driving unit includes a vertical power transmission gear rotated by the rotating power transmitted from the driving gear, the plurality of reduction gears, and the clutch unit in order to adjust the vertical angle of the inner tubular unit of the housing; and
the clutch unit further includes:
   a power conversion link rotatably installed between the horizontal power transmission gear and the vertical power transmission gear;
   a first relay gear installed at one side of an upper portion of the power conversion link to be engaged with the plurality of reduction gears and adapted to be rotated by the rotating power;

a second relay gear installed at an other side of the upper portion of the power conversion link to be engaged with the first relay gear and adapted to be selectively engaged with the horizontal power transmission gear and the vertical power transmission gear by rotation of the power conversion link;

a guiding member of which one end is connected to a long guiding hole formed at an end portion of the power conversion link and which has an actuating flap formed at an other end thereof for thereby guiding the rotation of the power conversion link;

a clutch box facing to the actuating flap and having an electromagnet attached thereto and contacted by the actuating flap as power is applied during adjusting of the vertical angle of the inner tubular unit of the housing; and a spring installed between the actuating flap and an interior of the clutch box and adapted to provide springback force to the actuating flap when the power transmitted to the electromagnet is turned off.

21. The device according to claim 17, wherein a guide rail is installed in a forward portion of a mounting groove formed inside the door panel, and a roller for guiding horizontal movement of the auto driving box along the guide rail and supporting the auto driving box at a predetermined height is rotatably installed at a lower portion of the auto driving box facing to the guide rail.

22. The device according to claim 16, wherein the angle adjusting device of a sideview mirror for vehicles comprises:

a manual adjusting box of which one end portion is rotatably installed in a door panel of a driver's seat and passenger's seat and adapted to interlock an inner tubular unit of a sideview mirror housing;

a vertical driving unit driven during adjusting of a vertical angle of the inner tubular unit of the housing; and a horizontal driving unit driven during adjusting of a horizontal angle of the inner tubular unit of the housing.

23. The device according to claim 22, wherein the vertical driving unit comprises:

an adjusting axis installed inside the manual adjusting box;

a vertical driving gear installed at one end of the adjusting axis and adapted to be rotated by rotating power of the adjusting axis during adjusting of the vertical angle;

a vertical adjusting handle formed at an other end of the adjusting axis outside the door panel and adapted to be held during adjusting of the vertical angle;

a vertical power transmission gear installed to vertically cross the vertical driving gear and adapted to be rotated by the rotating power by engagement with the vertical driving gear during adjusting of the vertical angle of the inner tubular unit of the housing;

a vertical rotating axis installed at a center of the vertical power transmission gear and adapted to be rotated by the rotating power of the vertical power transmission gear; and a vertical adjusting member of which an upper end portion is hingeably connected to a center of a lower end of a connecting member installed in the inner tubular unit of the housing and in which a guide ring penetrated by the vertical rotating axis to be engaged therewith is fixed for thereby raising and lowering the inner tubular unit of the housing by rotation of the vertical rotating axis.

24. The device according to claim 22, wherein the horizontal driving unit comprises:

an adjusting axis installed inside the manual adjusting box;

a horizontal flow preventing unit of a cone-type installed at the bottom surface of the manual adjusting box for thereby forming a spiral groove on an inner circumferential surface of the manual adjusting box;

a spring receiver installed inside the horizontal flow preventing unit;

a spring installed between an interior of the horizontal flow preventing unit and the spring receiver;

a cone-type friction gear inserted into the horizontal flow preventing unit to be engaged with the spiral groove at an other end portion of the adjusting axis;

a horizontal adjusting gear formed at a rear of the cone-type friction gear to be engaged with a horizontal rack gear formed in the door panel; and a horizontal adjusting handle formed at a rear of the horizontal adjusting gear and adapted to be held for thereby rotating the horizontal adjusting gear during adjusting of the horizontal angle of the sideview mirror.

* * * * *